Figure 5:
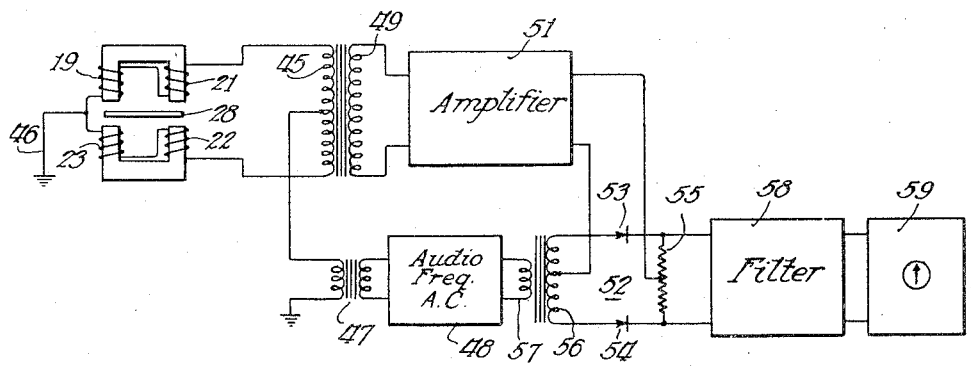

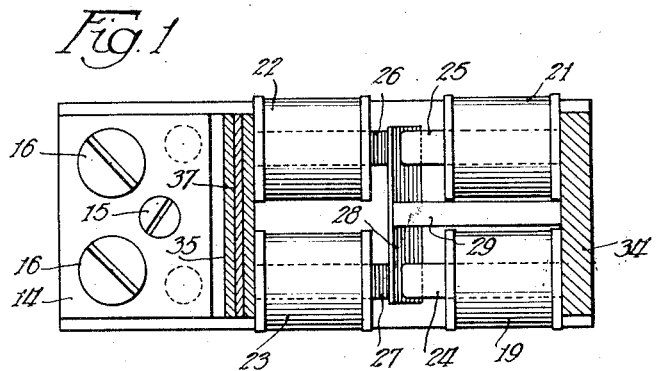
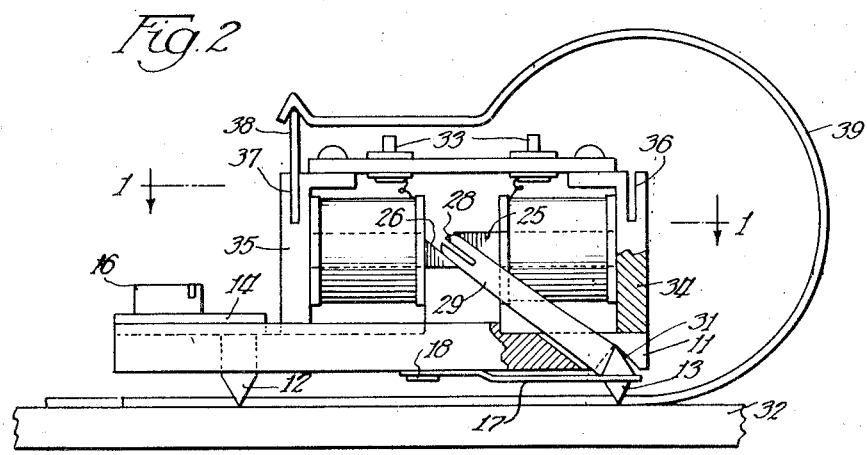
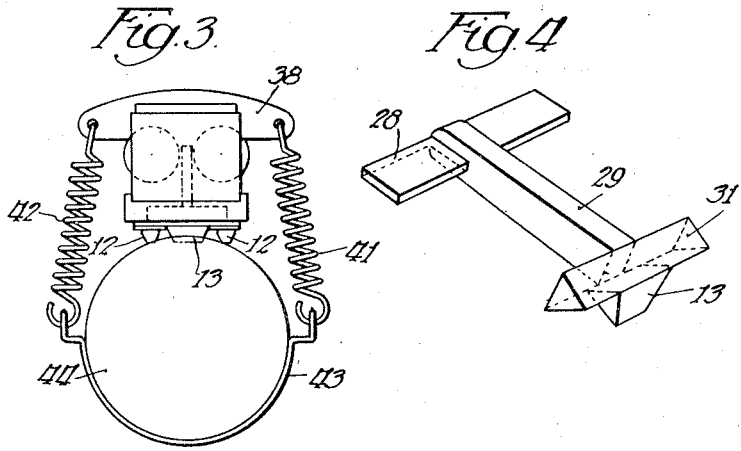

Patented Oct. 11, 1949

2,484,164

UNITED STATES PATENT OFFICE 2,484,164

ELECTROMAGNETIC STRAIN GAUGE

Claude M. Hathaway, Denver, Colo.

Application July 21, 1943, Serial No. 495,617

3 Claims. (Cl. 33—148)

This invention relates to improvements in gages and, more particularly, to gages of the electromagnetic type in which the variation of an air gap in accordance with the determination of a dimension, a deformation, a change in dimension, or movement of a body or framework under load or stress conditions is utilized to vary the inductive reactance of a coil, these variations in reactance being converted by an electric measuring circuit into corresponding changes in an indicating or recording instrument.

It is an object of this invention to provide an improved electromagnetic gage which is simple and compact in construction, which is readily mounted and which is provided with mechanical multiplication between means responsive to a variable factor and means for varying the reactance of the gage.

It is another object of this invention to provide a gage structure suitable for use as a strain gage which will measure the strain at the surface of a member under load or stress conditions.

It is still another object of this invention to provide an improved gage construction which provides ready adjustment of the movable armature element.

A still further object of this invention is to provide an improved strain gage structure in which the center of the mass is substantially midway between the supporting or contact points of the gage.

It is an additional object of this invention to provide an electric gage circuit which will give an indication of the direction and magnitude of the movement of an armature structure.

In carrying out the above and other objects of this invention there is provided a gage including a plurality of inductance coils each having a variable air gap in its magnetic circuit so that variations in the reactance of the coil correspond to a variable factor to be measured. This variable factor may be a determination of a dimension, a deformation, a change in dimension, or movement of a body or framework under load or stress conditions. A plurality of coils are each arranged as solenoids in two coaxial parallel positions with pole tips spaced apart from each other and from an armature mounted so as to provide variable air gaps between the armature and each of the pole tips. The armature is connected by mechanical means to a member responsive to the variable factor to be indicated. In illustrating such device it has been convenient to show a strain gage provided with two sets of knife edges which are arranged to engage a surface or framework under load or stress conditions and which support the strain gage assembly. One of the knife edges is provided with a certain degree of freedom as by pivoting the knife edge, and this movable knife edge is interconnected with a mechanical amplifying member or mechanism with the armature. A suitable electric circuit is provided for translating the variations in reactance of the gage unit coils into an indicating or recording quantity and, preferably, in order to obviate the necessity for a balancing unit the coils of the gage are connected in a bridge circuit. A suitable source of alternating current is provided to energize the bridge circuit across one diagonal. The other diagonal constitutes an output circuit which may be connected either directly or through an amplifier to a suitable discriminating circuit which, in turn, is connected to an indicating instrument to show the magnitude and direction of movement of the armature structure. The discriminating circuit is in the form of a bridge circuit having an input and an output, the latter being connected to suitable indicating or recording apparatus. The discriminating bridge circuit includes a plurality of rectifiers so arranged with respect to the input circuit and a circuit arranged to be energized from a suitable source of alternating current so as to produce direct currents having different polarities to indicate the different directions of movement of the armature structure. The input circuit and the circuit energized from the alternating current source are arranged in quadrature.

Figure 6:
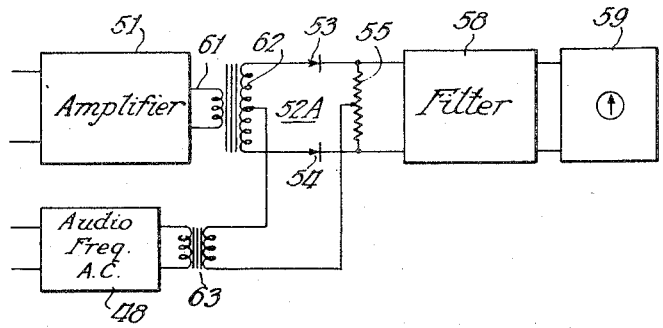

The invention both as to its organization and method of operation, together with further objects and advantages thereof, will be understood readily by reference to the following description taken in connection with the accompanying drawings, wherein Figure 1 is a top view of a gage having incorporated therein certain of the features of the invention as briefly outlined above; Fig. 2 is a side view of the gage shown in Fig. 1, and this gage is shown positioned on a member subject to stress or load conditions. This figure shows one manner in which the gage may be secured to such member. Fig. 3 is an end view of the gage shown arranged to be responsive to the variations occurring in a cylindrical member under stress or load conditions. This figure illustrates an apparatus by which the gage unit may be mounted for use without employing disadvantageous fastening means, such as stud bolts; Fig. 4 is a perspective representation of the armature assembly which is interconnected with a knife edge arranged to be responsive to a movement occurring from a stress or load placed upon a member; and Figs. 5 and 6 illustrate electric circuit arrangements suitable for obtaining an indication of the direction and magnitude of the movement of the armature.

By reference to Figs. 1, 2 and 3 it will be seen that the strain gage comprises a base portion 11 supported by two sets of knife edges, one set 12 being rigid and adjustable, and the other set 13 being movable. The adjustable set of knife edges which may comprise two knife edges, as seen in Fig. 3, is secured to a plate 14 mounted adjacent one end of the base portion 11. The plate 14 is longitudinally movable along the base portion 11 in response to actuation of a screw 15 which, in turn, operates a suitable cam mechanism, not shown. The plate 14 when adjusted may be secured in adjusted position by suitable fastening means such as the cap screws 16. The base portion 11 is provided with a resilient member 17 suitably secured thereto by a screw or rivet 18 and arranged to retain in position the movable knife edge 13. The base portion 11 may also comprise a portion of the magnetic flux path or magnetic circuit for a plurality of electric coils 19, 21, 22 and 23, each arranged as solenoids having pole tips 24, 25, 26 and 27, respectively. The four coils are arranged in two parallel coaxial positions so that the pole tips 24 and 27 are spaced apart from each other and, similarly, the pole tips 25 and 26 are spaced apart from each other. Interposed between the two sets of pole tips is a movable armature 28 which is supported at the free end of a lever arm 29. The base portion 11 is provided with a knife edged bearing 31 which is adapted to receive a knife edge 32 shown in Figs. 2 and 4. Preferably, the knife edge 31 is arranged in opposition to the movable knife edge 13, thereby providing for pivoted movement of the latter knife edge. The knife edge 31 is secured to the other end of the lever 29 which supports the armature 28. The lever 29, therefore, constitutes a suitable mechanical amplifying member which amplifies movement of the knife edge 13 so as to produce an increased movement of the armature 28. Each of the pole pieces 24 to 27 is provided with oblique faces so as to provide variable air gaps between each of the pole faces and the armature. Under a compressive force applied to a work piece, such as 32, the knife edge 13 would be moved in one direction and under a condition of strain the knife edge 13 will be moved in the other direction. This produces different changes in the reactance of the electromagnetic coils of the gage unit. The coils 19, 21, 22 and 23 are each connected to a plurality of suitable binding posts 33 so that the coils may be connected in any desired circuit arrangement.

Adjacent the ends of the solenoid coils there are provided end members 34 and 35 which serve to complete the electromagnetic circuit and also serve to support the various coils. Each of the supporting members 34 and 35 may be provided with suitable slots 36 and 37 which are adapted to receive a member such as the member 38 shown in Fig. 2. The member 38 may be engaged by a spring structure 39 which is suitably secured to the member to be tested 32 by a suitable means such as cementing, spot welding or other fastening arrangements. If after the gage unit has been mounted as shown in Fig. 2 it is desired to adjust the position of the armature 28 with respect to the pole pieces, this may be done without loosening the plate or slide from its secured position by loosening the cap screws 16 and adjusting the screw member 15 which operates a cam to move the slide 14. Thus the knife edge 13 will be pivoted in one direction or the other so that the armature 28 may be initially positioned midway between the pole tips of the electromagnetic coils or solenoids.

The arrangement shown in Fig. 3 shows that one or more members, such as 38, may be inserted in one or more of the slots 36 or 37 in the end members 34 or 35 of the gage unit. These members 38 extend transversely of the gage unit and at the outer ends thereof there are provided suitable spring members 41 and 42 which interconnect the member 38 with a strap 43 positioned underneath the member to be tested which has been shown as being a cylindrical member, such as a rod 44. The knife edges 12 and 13 engage the upper surface of the rod 44 so as to be responsive to the dimensional changes occurring as a result of the stress or load conditions subjected to the rod 44. The manner of fastening the gage unit to the member to be tested or the member in which a strain is to be measured as shown in Figs. 2 and 3, has the advantage of not requiring extensive special preparation, such as drilling and tapping the holes and fastening by stud bolts; and furthermore has the advantage of giving an indication of the strain appearing at the surface of the member being tested rather than at some distance from the surface. Furthermore, since the gage units are retained in position by resilient means, it is quite simple to substitute a new gage unit in the event it is desired to obtain a check on the data previously obtained.

By referring to Fig. 5 it will be seen how the strain gage unit heretofore described may be used in a circuit to indicate the degree and direction of stress or strain to which a body may be subjected. The strain gage unit may be secured to a member under stress or load conditions, and it will readily be appreciated that when the member is under compression, or the surface on which the gage is located is under compression, that the armature 28 will be moved in one direction as compared to the condition where the surface of the member being tested is under tension. It, of course, would be desirable to provide an arrangement which would indicate relatively slowly changing or static stress conditions, and which furthermore would indicate as to whether the member is under compression or tension. This may be accomplished by connecting the gage unit having the coils 19, 21, 22 and 23 arranged in a bridge circuit which includes a transformer winding 45 provided with a mid-tap. The gage coils 19 and 21 are therefore connected in series between one terminal of the transformer winding 45 and the ground connection 46. Likewise, the coils 22 and 23 are connected in series between the ground connection 46 and the other terminal of the transformer winding 45. The mid-point of the transformer winding 45 is connected through one winding of a transformer 47 to ground. The transformer 47 is connected to be energized from a suitable source of sinusoidal alternating current preferably in the audio frequency range, as, for example, two thousand cycles. When the armature 28 is midway between the pole pieces of the coils 19, 21, 22 and 23, the bridge circuit will be balanced so that the transformer winding 45 produces no effect in the transformer secondary winding 49 which is connected to a suitable amplifier 51. The amplifier 51 has its output connected to a discriminating circuit 52. The discriminating circuit 52 includes a pair of dry contact rectifiers or varistors 53 and 54 connected between a center tapped resistor 55 and a mid-tapped transformer winding 56. The mid-points on the resistor 55 and the transformer winding 56 are shown connected to the amplifier 51. The transformer winding 56 is energized from the primary winding 57 which, in turn, is connected to receive audio frequency energy from the alternating current source 48. The output of the discriminator circuit 52 is connected through a suitable filter 58 to an indicating device 59 which may comprise any suitable meter or instrument, such as a galvanometer, or a current meter having a zero center scale.

The discriminator circuit 52 shown in Fig. 5 shows an input circuit arranged between the mid-points of the transformer winding 56 and the resistor 55 with a transformer winding 57 arranged so as to supply alternating current energy to the discriminator circuit conjugately with respect to the input. This same relation may be obtained by another circuit arrangement illustrated in Fig. 6, wherein the amplifier 51 is connected to a transformer winding 61 which energizes a mid-tapped secondary winding 62. The transformer winding 62 comprises a portion of the discriminator circuit 52A, which again includes a pair of varistors 53 and 54 and a mid-tapped resistor 55. The discriminator circuit 52A is connected through a suitable filter 58 to an indicating instrument 59. The alternating current source 48 is connected through a transformer 63 having a secondary winding connected between the mid-points of the resistor 55 and the transformer winding 62. Thus in this arrangement the audio frequency current is fed conjugately to the discriminator circuit 52A with respect to the input circuit which is energized from the transformer winding 61.

As soon as the member upon the strain gage unit is mounted is subjected to strain or stress, the armature 28 will be displaced so as to unbalance the bridge circuit, thereby to supply alternating current to the secondary winding 49 which is connected to the amplifier 51. The output of the amplifier 51 is connected to the discriminator circuit 52 conjugately with respect to the audio frequency source so that one of the varistors will supply direct current through the filter 58 to the indicating instrument 59. Because of the symmetry of the discriminator circuit 52 with respect to the audio frequency source 48, no direct current will be transmitted to the indicating instrument 59 unless an alternating current component is supplied by the output of the amplifier 51. The output current of the amplifier 51 is therefore in phase with the voltage supplied by one half of the secondary winding 56, dependent upon the movement of the direction of the armature 28 with respect to the pole pieces in the bridge circuit of the strain gage. The phase of the current supplied by the amplifier 51 will control the direction of the direct current transmitted by the varistors 53 and 54. The alternating current supplied to the discriminator circuit helps to overcome the initial resistance of the varistors so that they are more responsive to slight changes in the magnitude of the alternating current component supplied by the amplifier 51. The gage unit, therefore, may be used for detecting static and slowly varying strain conditions up to changes which are fairly high in frequency.

While for the purposes of illustrating this invention the strain gage unit has been shown in its preferred embodiment, and the strain gage unit has been shown as used with certain circuit arrangements, it is to be understood that the invention is not to be limited thereby since obviously variations may be made in instrumentalities and in the circuit arrangements employed, without departing from the spirit and scope of the invention as defined in the appended claims.

What is claimed is:

1. An electric gage comprising two sets of two electromagnets arranged coaxially with pole tips spaced apart, an armature movably positioned therebetween and being of such dimensions as to leave variable air gaps between said pole tips and said armature, means connecting all of said electromagnets in a bridge circiut, a source of alternating current, means supplying alternating current from said source to one diagonal of said bridge circuit, a rectifier discriminating circuit connected to be energized from said bridge circuit, means for supplying alternating current from said source to said discriminating circuit independent of the bridge circuit, and means connected to said discriminating circuit for indicating the direction and magnitude of movement of said armature.

2. An electric gage comprising two sets of two solenoids arranged coaxially with pole tips spaced apart, an armature movably positioned therebetween and being of such dimensions as to leave variable air gaps between said pole tips and said armature, means connecting all of said solenoids in a bridge circuit, a source of alternating current, means supplying alternating current from said source to one diagonal of said bridge circuit, a discriminating bridge circuit including an input, an output and a plurality of rectifiers, said input being connected to be energized with currents obtained from said first bridge circuit, means for supplying alternating current from said source independently of the remainder of said circuits to said discriminating circuit conjugately with respect to said input, and means connected to said output for indicating the direction and magnitude of movement of said armature.

3. An electric gage having an elongated base, a magnetic flux circuit including said base, an air gap, and two pairs of horizontal pole pieces each provided with a similar oblique faced pole piece, said pole pieces being arranged parallel to each other above said base, a coil surrounding each pole piece, said pole pieces being arranged in coaxial pairs to provide an air gap between the pole pieces of each pair of coils, a movable armature positioned within said air gap and normally arranged equidistant from each pole piece, a rigid adjustable knife edge mounted adjacent one end of and beneath said base, a knife edge bearing located adjacent the other end of and beneath said base, a movable knife edge member having a knife edge positioned within said knife edge bearing and another knife edge arranged in opposition to said first knife edge for supporting the other end of said base, said movable knife edge member having a lever arm extending at an acute angle to a line drawn through both the knife edges thereof, said arm at its free end supporting said movable armature.

CLAUDE M. HATHAWAY.

(References on following page)

REFERENCES CITED

The following references are of record in the file of this patent:

UNITED STATES PATENTS

| Number | Name | Date |
|---|---|---|
| 1,891,155 | Harrison | Dec. 13, 1932 |
| 2,004,361 | Arms et al. | June 11, 1935 |
| 2,122,664 | Terry | July 5, 1938 |
| 2,136,219 | Scherbatskoy | Nov. 8, 1938 |
| 2,180,176 | Stone | Nov. 14, 1939 |
| 2,183,078 | Kemler | Dec. 12, 1939 |
| 2,240,184 | Hathaway | Apr. 29, 1941 |
| 2,246,175 | Huggenberger | June 17, 1941 |
| 2,338,732 | Nosker | Jan. 11, 1944 |

OTHER REFERENCES

A. C. Bridge Methods by Hague, 4th ed., 1938, pp. 237–238.

Journal of Scientific Instruments, vol. 19, Aug. 1942, pp. 117–119.